Aug. 8, 1944.  A. L. CHRISTIANSEN  2,355,509
FISH BEHEADING MACHINE
Filed March 14, 1942
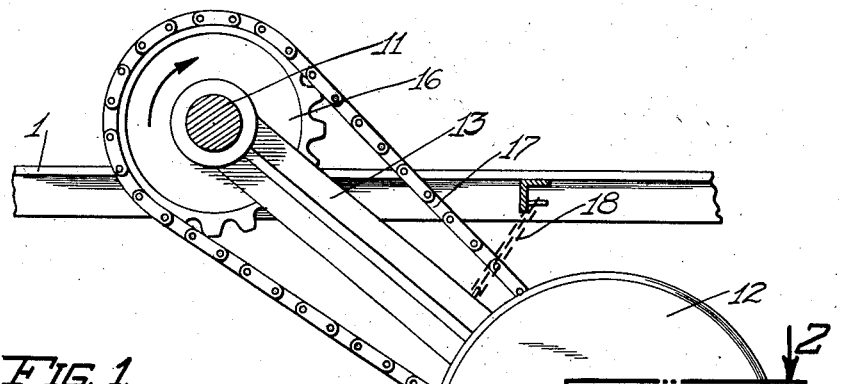
FIG. 1.
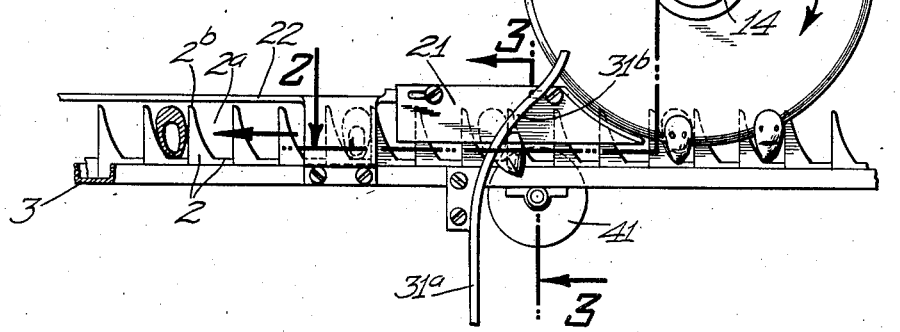
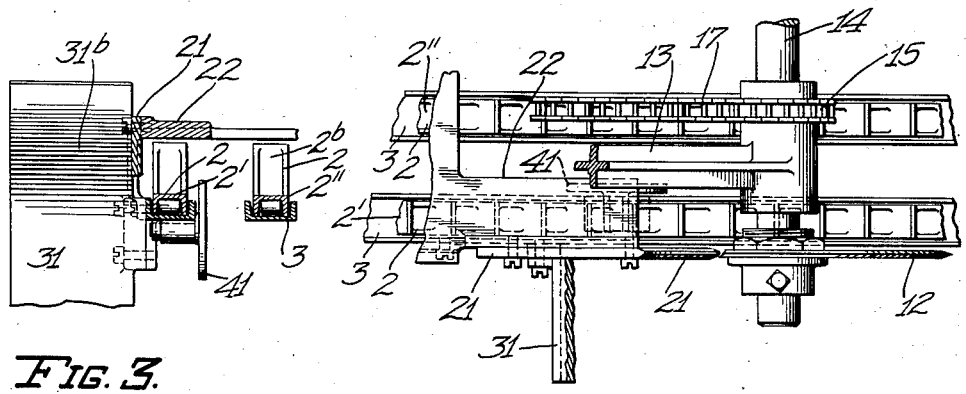
FIG. 3.
FIG. 2.
INVENTOR.
ANDREW L. CHRISTIANSEN
BY
*William B Hall*
ATTORNEY.

Patented Aug. 8, 1944

2,355,509

UNITED STATES PATENT OFFICE 2,355,509

FISH BEHEADING MACHINE

Andrew L. Christiansen, Willowbrook, Calif.

Application March 14, 1942, Serial No. 434,635

3 Claims. (Cl. 17—4)

This invention relates to a fish beheading machine and is a continuation in part of my co-pending application for Fish machines, Serial No. 162,581, filed September 7, 1937, now Patent No. 2,304,337, issued December 8, 1942.

One of the principal objects of this invention is to provide a means for removing the heads of fish with a minimum of moving parts, said heads being removed, after being partially severed, by the fish conveying means of the machine.

Another important object of this invention is to provide an inclined obstruction adjacent to the fish conveying means of the machine, whereby the heads are forcefully removed from the bodies of the fish, as the fish are advanced by the conveying means, and particularly an inclined obstruction whereby the heads of the fish are forced downwardly to cause the rupture of the heads from the bodies.

With these and other objects in view, as will appear hereinafter, I have devised a fish beheading machine, having certain novel features of construction, combination, and arrangement of parts and portions as will be hereinafter described in detail and particularly set forth in the appended claims, reference being had to the accompanying drawing and the characters of reference thereon, which form a part of this application, in which:

Fig. 1 is a fragmentary side elevational view of a fish machine embodying my fish beheading means;

Fig. 2 is a fragmentary plan view thereof, partially in section, taken at 2—2 of Fig. 1; and Fig. 3 is a fragmentary sectional elevation thereof taken through 3—3 of Fig. 1.

My machine is shown as constructed on a frame 1. A continuous belt conveyor 2 is carried thereon, with a portion moving horizontally, as shown. This conveyor is shown as consisting of parallel and synchronized link belts, the outer one being designated 2' and the inner one 2". Each is guided in a channel 3. The conveyor, comprising the link belts, is provided with a plurality of transverse fish-carrying pockets 2ᵃ. Each link belt consists of links 2ᵇ having outwardly extending brackets. The portions between the brackets, which extend upwardly, form the aforementioned pockets 2ᵃ.

On the frame is a drive shaft 11 which operates the fish head severing cutter 12. This cutter is revolubly held on a swinging frame 13, the fixed end of which is pivoted on the shaft 11. The cutter 12 is mounted on a shaft 14 on which is also mounted a sprocket 15. This sprocket is driven from the sprocket 16 through a chain 17.

The cutter 12, which is a disk, is positioned immediately to one side of the conveyor 2 for severing the heads from the bodies of the fish carried in the pockets of the conveyor. The downward movement of the disk cutter 12 is limited by a stop or chain 18, so that the cutting edge of the cutter is spaced above the bottom of the pockets 2ᵃ. Thus, the heads of the fish are only partially severed from the bodies, and as shown, the cut is made through the back bone portion of the fish so that substantially only a small portion of the thin belly walls of the fish hold the heads to the bodies. The purpose of only such partial severance of the heads is to prevent cutting the entrails of the fish and to permit the partial withdrawal thereof when the heads are forcefully removed, as will be hereinafter described.

At the same side of the conveyor, at which the cutter 12 is located, there is provided a retaining plate 21, which is located substantially in alignment with or lies in the same plane as the disk cutter, so that the retaining plate enters the cut portion of the fish as the same are advanced when the conveyor is moved from the cutter in the direction of the retaining plate. The retaining plate 21 is carried by a bridge plate 22 which is stationary and positioned immediately above the pockets of the conveyor. This bridge plate holds the fish in the pockets from above.

At the side of the retaining plate opposite the conveyor is mounted a fish head removing plate 31. This plate 31 is positioned at right angles to the plate 21 and the front face of the conveyor. The lower portion 31ᵃ of the plate 31 is shown vertical, while the upper portion 31ᵇ is shown as inclined forwardly, i. e., towards the forward end of the retaining plate 21. The inclined portion 31ᵇ is curved upwardly gradually from the upper end of the straight portion 31ᵃ, the curve or inclination beginning a slight distance below the bottom of the pockets of the conveyor.

On the frame, at the side of the conveyor opposite the retaining plate 21, is located a narrow roller 41 which is rotatably mounted on an axis parallel to the axis of the cutter. The upper portion of the roller or disk 41 extends above the bottom of the pockets of the conveyor 2 and is arranged to compress the fish from below and thus assist in the expulsion of the entrails when the heads are removed.

As the partially beheaded fish are advanced by the conveyor, so that the body is located on the conveyor side of the retaining plate and the head located at the opposite side, or the side at which the obstruction or inclined plate 31 is located, the heads engage the latter plate and are gradually forced downwardly as the conveyor advances, causing forceful removal of the heads and withdrawing such portion of the entrails as remain attached thereto.

Though I have shown and described a particular construction, combination, and arrangement of parts and portions of my fish beheading machine, I do not wish to be limited to the same, but desire to include in the scope of my invention the construction, combination, and arrangement, substantially as set forth in the appended claims.

I claim:

1. In a machine of the class described, a conveyor having transverse fish-carrying pockets for carrying fish transversely therein, a stationary retaining plate at the side of the conveyor for entering the fish between the bodies and the heads thereof and for retaining the bodies of the fish in said pockets, and a downwardly inclined fixed obstruction at the side of the retaining plate opposite the conveyor for engaging the heads of the fish, the face of said downwardly inclined fixed obstruction being substantially perpendicular to the vertical plane of travel of the conveyor, and extending from substantially the top of the conveyor at an angle downwardly and backwardly to below the pockets, said face being adapted for forcing the heads of the fish downwardly as the conveyor is advanced for forcefully removing the same from the bodies of the fish.

2. In a machine of the class described, a conveyor having transverse fish-carrying pockets, means for partially severing the heads of fish extending beyond one side of the conveyor, a stationary retaining plate at the same side of the conveyor in substantial alignment with the cutting means, said plate being adapted to enter the opening of the fish made by the cutting means when the conveyor is advanced, and a downwardly inclined fixed obstruction at the side of the retaining plate opposite the conveyor for engaging the heads of the fish, the face of said downwardly inclined fixed obstruction being substantially perpendicular to the vertical plane of travel of the conveyor, and extending from substantially the top of the conveyor at an angle downwardly and backwardly to below the pockets, said face being adapted for forcing the heads of the fish downwardly as the conveyor is advanced for forcefully removing the same from the bodies of the fish.

3. In a machine of the class described, a conveyor having transverse fish-carrying pockets for carrying fish transversely therein, means at one side of the conveyor for entering the fish between the bodies and the heads thereof, and for retaining the bodies of the fish in said pockets, and obstruction means in association with the first means at the side thereof opposite the conveyor, said obstruction means being downwardly inclined and positioned to engage the heads of the fish, the face of said downwardly inclined obstruction being substantially perpendicular to the vertical plane of travel of the conveyor, and extending from substantially the top of the conveyor at an angle downwardly and backwardly to below the pockets, said face being adapted for forcing the heads of the fish downwardly as the conveyor is advanced for forcefully removing the heads from the bodies of the fish.

ANDREW L. CHRISTIANSEN.